Jan. 30, 1940.  F. BISZANTZ  2,188,548
VEHICLE
Original Filed March 31, 1938
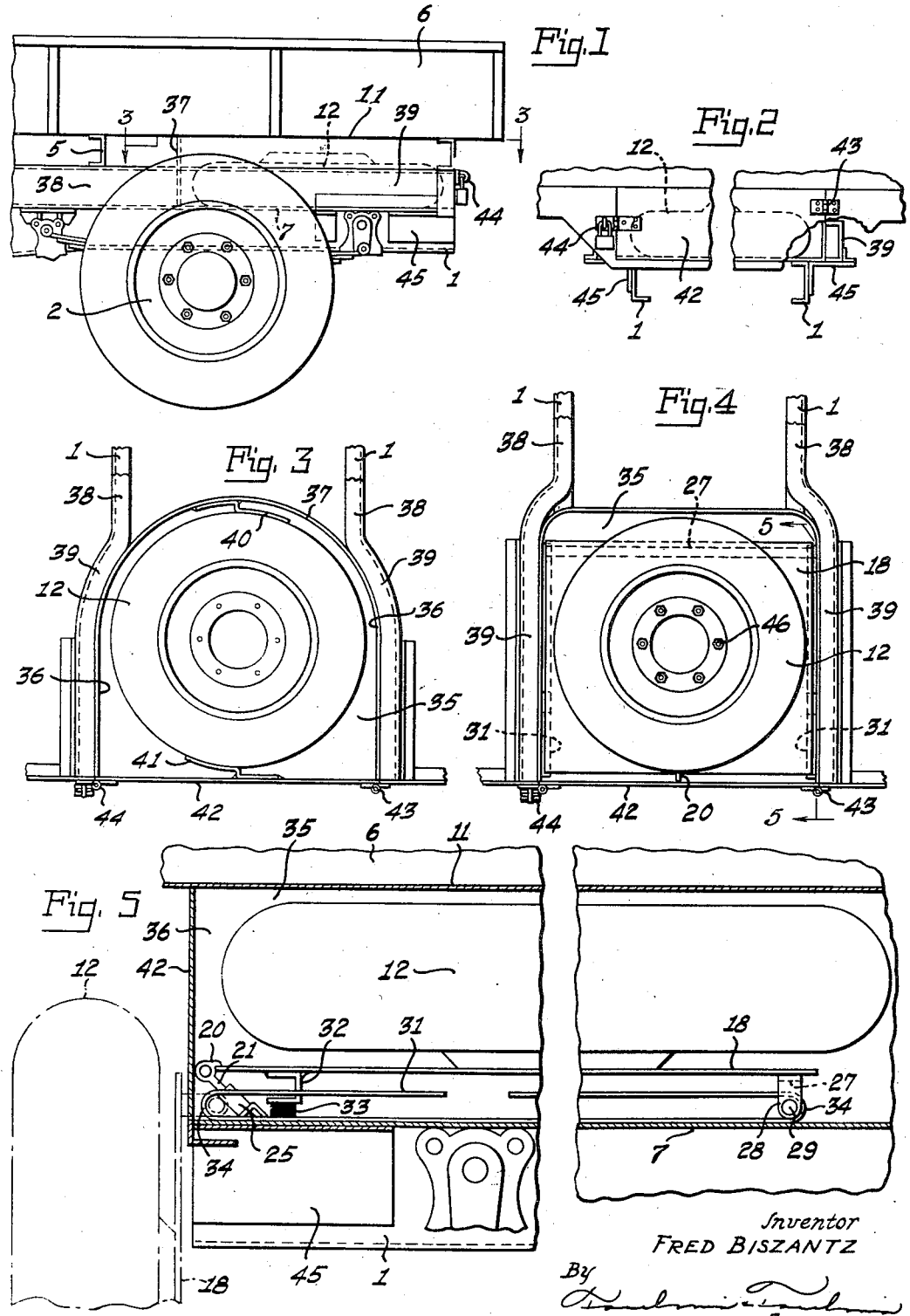
Inventor
FRED BISZANTZ Patented Jan. 30, 1940

2,188,548

UNITED STATES PATENT OFFICE 2,188,548

VEHICLE

Fred Biszantz, Galion, Ohio, assignor to The Galion Metallic Vault Company, Galion, Ohio, a corporation of Ohio Original application March 31, 1938, Serial No. 199,214. Divided and this application November 28, 1938, Serial No. 242,675

2 Claims. (Cl. 296—37)

My invention relates to vehicles and, in particular, to cargo-carrying vehicles and means for transporting tires, tools and the like.

Heretofore, it has been a problem to properly store and convey tires, tools and similar equipment used with cargo-carrying bodies that were either stationary or tilting. The chassis has mounted upon it the usual cab, motor and housing therefor, which does not provide any adequate space for the storage of tools nor any means for protecting the tools or tires from the elements.

It is an object of this invention to provide means for carrying tires, excavating tools and the like, which are needed on the road in connection with either stationary bodies or dump bodies. For this purpose, there is provided for both types of bodies adequate supports for such tires and tools to prevent their rattling and injury during transit.

It is a further object of the present invention to provide a compartment for the carrying of a spare wheel and tire, or tools, adjacent the rear end of a truck body, the compartment being preferably provided between the rear ends of sub-frame members and being accessible from the rear.

In particular, it is an object of this invention to provide means by which such tires and tools may be stored in relatively shallow compartments and can be readily withdrawn from said compartments and brought into a vertical position from a horizontal position so as to facilitate the loading and unloading of tires and tools within said compartments. Otherwise, the compartments being long and shallow, it is difficult to mount the tires and tools within such compartments without rattling. This is particularly true of compartments which are carried with tilting bodies, where it is necessary to firmly anchor such equipment within the storage compartments.

Another object of this invention is to provide a sliding bottom as a carrier for tools or tires which can assume, when withdrawn from the compartment, a vertical position, either at the side or on the rear of the truck so that it is easy to mount and de-mount tools and tires in a vertical position and thereafter slide them in a horizontal position into the compartment, where they are securely fastened in a horizontal position.

This application is a division of my application Serial Number 199,214, filed March 31, 1938, now Patent 2,146,107, dated February 7, 1939.

Referring to the drawing:

Figure 1 is a side elevation of a body having a rear entrance tire carrier beneath the body;

Figure 2 is a rear elevation thereof;

Figure 3 is a section on the line 3—3, looking in the direction of the arrows, of Figure 1;

Figure 4 is a section similar to Figure 3, but showing a modified form of tire support which can be removed and which can assume a vertical position;

Figure 5 is a section on the line 5—5, looking in the direction of the arrows, of Figure 4.

The accompanying drawing portrays embodiments of the present invention in accordance with which a compartment is provided beneath the rear end of the body of the truck, this compartment being accessible from the rear end of the truck.

Referring to the drawing in detail and first to the embodiment shown in Figures 1 to 3, 1, designates the main frame members of the truck which has wheels 2. A sub-frame having longitudinally extending members 38 is mounted directly upon the longitudinal truck frame members 1. Mounted upon these sub-frame members 38 are a plurality of cross-frame members 5 which, in turn, support the stationary truck body 6.

A spare tire and wheel carrying compartment 35 is formed by a vertical sheet having side walls 36 and a rounded forward connecting portion 37 which fits between the sub-frame members 38 which are curved outwardly at 39 to form embracing structures for positioning the walls 36 and 37 of the compartment 35. The top of compartment 35 may be formed by the bottom 11 of the truck body. The bottom of the compartment is formed by a sheet 7 which is suitably disposed between the sub-frame members 38 adjacent their bottom edges. The tire and wheel 12 is held in position by the spring clamps 40 and 41 which are mounted upon the curved wall 37 and the rear door 42 of the compartment, respectively. The rear door 42 is hinged at 43 in any suitable manner and is adapted to be locked at 44 by a suitable hasp arrangement.

The sub-frame members 38 at their rear are mounted upon a bracket 45 which is attached to the outer sides of the truck frame members 1. The connection between the bracket 45 and the frame members 1 and 38 may be by bolting, riveting, or welding.

In Figures 4 and 5 there is shown a modified construction in accordance with which the spare tire and wheel is carried upon a slidable false bottom which is adapted to be pulled rearwardly out of the compartment and then allowed to pivot downwardly so as to present the spare tire and wheel in a vertical position for ready mounting or demounting. In accordance with the construction shown in these figures the spare tire and wheel 12 is detachably carried as by means of bolts 46 securing the wheel 12 to the false bottom 18. False bottom 18 is retained in position by the spring-pressed hook 20 carried on the shaft 21 around which is a spring concealed within housing 25 which is mounted upon a bracket upon the floor 7 of the compartment. This false bottom 18 is supported at its forward portion by a transversely extending member 27 having downwardly extending ends 28 which carry axles 29 upon which are mounted rollers (not shown) which travel in tracks 31 fixedly mounted on the inside of the compartment upon the floor 7 thereof.

In the rear end of this false bottom 18 is a depending bracket 32 having a rubber cushion 33 suitably mounted upon the floor 7 for yieldingly supporting the rear end of the false bottom 18 and for allowing same to slide longitudinally. The tracks 31 are formed at their ends 34 into loops which limit the inward and outward travel of the false bottom 18. In its outermost position the false bottom 18 assumes a vertical position, as shown by the dotted lines in Figure 5. This presents the spare wheel and tire 12 in a vertical position so that it can be easily mounted and demounted and then elevated into horizontal position and moved into the compartment 35. Instead of carrying a spare wheel upon the false bottom 18 or in addition thereto tools may, if desired, be mounted upon the false bottom 18.

It is thus possible to fasten conveniently, as by means of bolts 46, the tire 12 upon the false bottom 18 when the tire is in vertical position and to then telescope the tire within the compartment 35 which is just deep enough to comfortably receive the tire in its horizontal position.

It will be understood that I desire to comprehend within my invention such modifications as come within the scope of the claims and the invention.

Having thus fully described my invention, what I claim as new and desire to secure by Letters Patent is:

1. In combination, a truck frame, a body, sub-frame members longitudinally disposed for supporting said body on said truck frame, the rear ends of said sub-frame members bent outwardly to form an enlarged space therebetween, means to form a compartment having a rear opening and located between said longitudinal sub-frame members, a rear closure for said compartment, and means therein for retaining articles in position in the compartment.

2. In combination, a truck frame, sub-frame members mounted thereon, means supporting the body on said sub-frame members in spaced relationship to said truck frame, and means forming a compartment at the rear of said truck frame and body opening to the rear of the truck and located between the body and the truck frame and beneath the means for supporting the body.

FRED BISZANTZ.